United States Patent
Aaron

(10) Patent No.: US 7,400,891 B2
(45) Date of Patent: Jul. 15, 2008

(54) METHODS, SYSTEMS AND COMPUTER PROGRAM PRODUCTS FOR REMOTELY CONTROLLING WIRELESS TERMINALS

(75) Inventor: Jeffrey A. Aaron, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 188 days.

(21) Appl. No.: 10/985,266

(22) Filed: Nov. 10, 2004

(65) Prior Publication Data

US 2006/0099965 A1    May 11, 2006

(51) Int. Cl.
*H04Q 7/20* (2006.01)
*H04M 1/66* (2006.01)

(52) U.S. Cl. .............. 455/456.4; 455/456.3; 455/420; 455/565; 455/456.1; 455/456.2; 455/456.5; 455/456.6; 455/410; 455/411

(58) Field of Classification Search .............. 455/456.3, 455/420, 456.4, 565, 456.1, 456.2, 456.5, 455/456.6, 410, 411
See application file for complete search history.

(56) References Cited

U.S. PATENT DOCUMENTS

| | | | |
|---|---|---|---|
| 5,854,978 A * | 12/1998 | Heidari | 455/418 |
| 6,011,973 A * | 1/2000 | Valentine et al. | 455/456.6 |
| 6,356,762 B1 * | 3/2002 | Guenther | 455/456.4 |
| 6,496,703 B1 * | 12/2002 | da Silva | 455/456.4 |
| 6,597,895 B1 * | 7/2003 | Maeda | 455/88 |
| 6,690,940 B1 * | 2/2004 | Brown et al. | 455/456.4 |
| 6,694,143 B1 * | 2/2004 | Beamish et al. | 455/456.1 |
| 6,721,542 B1 * | 4/2004 | Anttila et al. | 455/68 |
| 6,771,954 B1 * | 8/2004 | Yoneyama et al. | 455/420 |
| 6,823,199 B2 * | 11/2004 | Gough | 455/567 |
| 6,907,254 B1 * | 6/2005 | Westfield | 455/456.4 |
| 6,937,868 B2 * | 8/2005 | Himmel et al. | 455/456.4 |
| 6,961,579 B2 * | 11/2005 | Inukai et al. | 455/456.4 |
| 6,987,975 B1 * | 1/2006 | Irvin et al. | 455/456.1 |
| 7,013,128 B2 * | 3/2006 | Ozeki et al. | 455/411 |
| 7,058,414 B1 * | 6/2006 | Rofheart et al. | 455/456.4 |
| 7,079,851 B2 * | 7/2006 | Makuta | 455/456.3 |
| 7,187,950 B2 * | 3/2007 | Hintermeier et al. | 455/565 |
| 7,215,978 B2 * | 5/2007 | Hasegawa | 455/558 |
| 7,289,790 B2 * | 10/2007 | McCorkle et al. | 455/411 |
| 2002/0077118 A1 * | 6/2002 | Zellner et al. | 455/456 |
| 2002/0198005 A1 * | 12/2002 | Hilton et al. | 455/456 |
| 2003/0008662 A1 * | 1/2003 | Stern et al. | 455/456 |
| 2003/0073448 A1 * | 4/2003 | Ozeki et al. | 455/456 |
| 2004/0048624 A1 * | 3/2004 | Ko et al. | 455/457 |
| 2004/0121783 A1 * | 6/2004 | Chua et al. | 455/456.1 |
| 2004/0203600 A1 * | 10/2004 | McCorkle et al. | 455/411 |
| 2004/0203601 A1 * | 10/2004 | Morriss et al. | 455/411 |
| 2005/0090267 A1 * | 4/2005 | Kotzin | 455/456.4 |
| 2005/0119008 A1 * | 6/2005 | Haumont | 455/456.1 |

(Continued)

*Primary Examiner*—Nick Corsaro
*Assistant Examiner*—Christopher M Brandt
(74) *Attorney, Agent, or Firm*—Myers Bigel Sibley & Sajovec

(57) ABSTRACT

Wireless terminals are remotely controlled by identifying a wireless terminal that is located at a premises and obtaining at least one operational authorization rule for the wireless terminal that was identified, and that applies to the premises at which the wireless terminal is located. Selected operations of the wireless terminal are disabled and/or enabled in response to the at least one operational authorization rule that was obtained for the wireless terminal that was identified and that applies to the premises at which the wireless terminal is located.

16 Claims, 3 Drawing Sheets

U.S. PATENT DOCUMENTS

2005/0221841 A1* 10/2005 Piccionelli et al. ....... 455/456.3
2005/0266857 A1* 12/2005 Poikela .................... 455/456.3
2005/0266859 A1* 12/2005 Tejani et al. ............. 455/456.4
2005/0282559 A1* 12/2005 Erskine et al. ........... 455/456.4
2006/0014547 A1*  1/2006 Walter ..................... 455/456.1
2006/0035649 A1*  2/2006 Vargas .................... 455/456.4
2006/0099959 A1*  5/2006 Staton et al. ............. 455/456.1

* cited by examiner

METHODS, SYSTEMS AND COMPUTER PROGRAM PRODUCTS FOR REMOTELY CONTROLLING WIRELESS TERMINALS

FIELD OF THE INVENTION

This invention relates to wireless terminals, and more particularly to systems, methods and computer program products for controlling operations of wireless terminals.

BACKGROUND OF THE INVENTION

Wireless terminals have become pervasive in modern society. As used herein, the term "wireless terminal" includes cellular and/or satellite wireless telephones with or without a multi-line display; Personal Communications System (PCS) wireless terminals that may include data processing, facsimile and/or data communications capabilities; Personal Digital Assistants (PDA) or other devices which may be termed "handhelds" that can include a radio frequency transmitter/receiver (transceiver) and a pager, Internet/Intranet access, Web browser, email, text/instant messenger, organizer, calendar and/or a global positioning system (GPS) receiver; and/or conventional laptop and/or palmtop computers or other appliances that include a radio frequency transceiver. Note that the term "terminal" as used herein does not necessarily imply limited functionality as is sometimes implied in the use of the word "terminal" in the computer field, but rather may include richly functional devices with respect to communications functions, computational functions, and/or other functions.

SUMMARY OF THE INVENTION

Exemplary embodiments of the present invention provide methods. of remotely controlling wireless terminals by identifying a wireless terminal that is located at a premises and obtaining at least one operational authorization rule for the wireless terminal that was identified, and that applies to the premises at which the wireless terminal is located. As used herein, the term "premises" includes an educational institution, a business facility, an entertainment venue and/or another physical facility and/or definable area/location such as an outdoor soccer field, a city or state park, or a river recreation area that is controlled by a third party other than the owner/user of the wireless terminal and the telecommunications provider for the wireless terminal. Selected operations of the wireless terminal are disabled and/or enabled in response to the at least one operational authorization rule that was obtained for the wireless terminal that was identified and that applies to the premises at which the wireless terminal is located. Other embodiments of the present invention identify that the wireless terminal is no longer located at the premises and withdraw the disabling and/or enabling of the selected operations of the wireless terminal in response thereto.

In other embodiments of the present invention, the operational authorization rules for wireless terminals are set based on an identification of the wireless terminal and a set of rules that apply to various premises and various operations of the wireless terminal. The rules may be set by a party associated with the premises and/or by a party associated with the owner/user of the wireless terminal.

In still other embodiments of the invention, prior to disabling and/or enabling selected operations of the wireless terminal, the wireless terminal may authenticate the party associated with the premises, to verify that the party associated with the premises has valid authority to control the wireless terminal. In other embodiments, the disabling and/or enabling of the selected operations of the wireless terminal also are logged.

In yet other embodiments of the present invention, the operational authorization rules can include a plurality of scenarios for a wireless terminal that was identified, and that apply to the premises at which the wireless terminal is located. Thus, first selected operations of the wireless terminal may be disabled and/or enabled in response to occurrence of a first scenario at the premises, and second operations of the wireless terminal may be disabled and/or enabled in response to occurrence of a second scenario at the premises. In still other embodiments, the disabling and/or enabling of the selected operations may be overridden in response to an override condition. Emergencies thereby may be accommodated.

Many embodiments of disabling and/or enabling of selected operations of the wireless terminal may be provided according to various embodiments of the present invention. For example, disabling and/or enabling of selected operations of the wireless terminal may be performed as a function of time of day, an event schedule at the premises, a class of the wireless terminal, a class of the user of the wireless terminal, a class of a message transmitted to or from the wireless terminal and/or the location of the wireless terminal within the premises. In other embodiments, respective transmit or receive operations of the wireless terminal may be enabled, while disabling respective receive or transmit operations of the wireless terminal. In yet other embodiments, the selected operations of the wireless terminal that are disabled and/or enabled may include applications that execute on the wireless terminal, functions that are provided by the wireless terminal and/or communications that are provided by the wireless terminal.

Embodiments of the invention have been described primarily with respect to methods of remotely controlling wireless terminals. However, other embodiments of the invention can provide systems for remotely controlling wireless terminals, including a rules database, a proximity detector and a monitoring system. The rules database is configured to store therein operational authorization rules for wireless terminals as a function of a plurality of premises at which the wireless terminals may be located. The proximity detector is configured to identify at least one wireless terminal that is located at a premises. The monitoring system is responsive to the proximity detector and to the rules database, and is configured to disable and/or enable selected operations of the at least one wireless terminal that is located at the premises in response to at least one operational authorization rule for the at least one wireless terminal that applies to the premises. Setting of rules, authentication, logging, withdrawing of disabling and/or enabling, multiple scenarios and/or overriding may be provided, as was described above.

In some embodiments, the rules database includes a third party usage policy database that is configured to store therein rules that apply to the premises that is controlled by a third party, and a central preferences database that is configured to store therein rules that apply to the wireless terminals. Moreover, in some embodiments, the monitoring system includes a third party controller that is configured to provide the rules that apply to the premises, from the third party usage policy database to the at least one wireless terminal that is located at the premises, and a central monitor that is configured to provide the rules that apply to the wireless terminal, from the central preferences database to the at least one wireless terminal that is located at the premises. The at least one wireless terminal is configured to disable and/or enable selected operations thereof in response to the rules that apply to the premises and the rules that apply to the wireless terminal. A central server also may be provided that is configured to accept administrative preferences for a plurality of wireless terminals and to store the administrative preferences in the central preferences database.

Moreover, computer program products also may be provided that can provide functionality associated with any of these methods and/or systems, according to various embodiments of the present invention. Other methods and/or computer program products according to other embodiments of the invention will be or become apparent to one of skill in the art upon review of the following drawings and Detailed Description. It is intended that all such additional methods and/or computer program products be included within this description, be within the scope of the present invention, and be protected by the accompanying claims.

DETAILED DESCRIPTION

Figure 1:
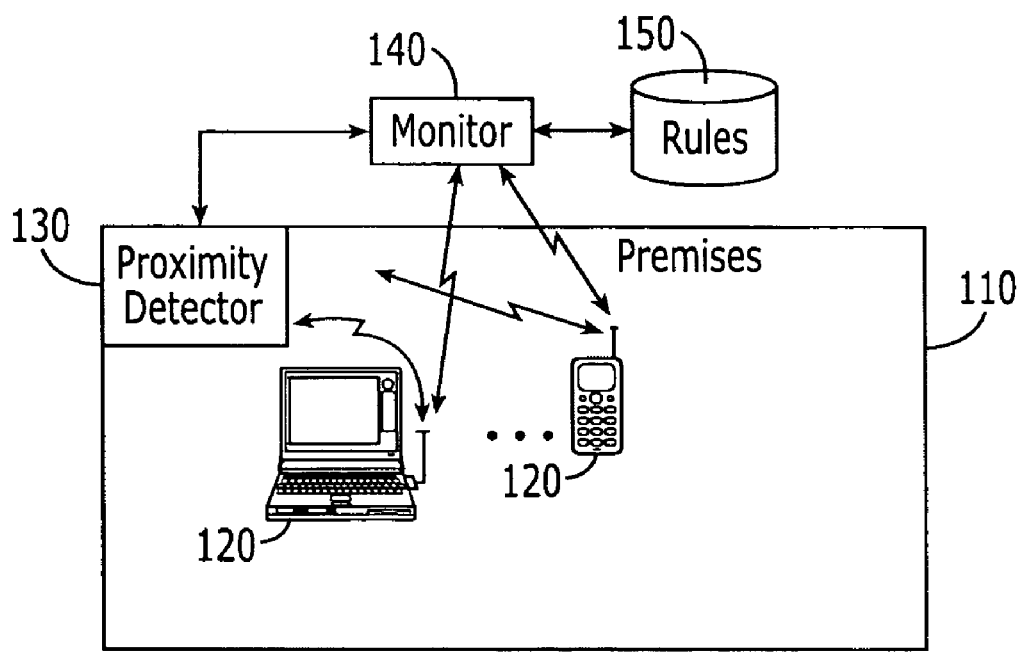
FIG. 1 is a block diagram of systems, methods and/or computer program products according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another.

For example, a first rule could be termed a second rule, and, similarly, a second rule could be termed a first rule without departing from the teachings of the disclosure.

FIG. 1 is a block diagram of methods, systems and/or computer program products for remotely controlling wireless terminals according to various embodiments of the present invention. As shown in FIG. 1, some embodiments of the present invention include a proximity detector 130 that is configured to identify a wireless terminal 120 that is located at a premises 110. The premises 110 may be an educational institution, a business facility, a government facility, an apartment/housing complex, a neighborhood, a city block, a residence, an entertainment venue and/or any other structure and/or definable area/location. It will also be understood by those having skill in the art that, as used herein, "identifying a wireless terminal" means that the actual identity of the wireless terminal 120, such as its mobile identification number, Internet Protocol (IP) address and/or other unique identifier, is obtained, rather than merely detecting the presence of an unidentified wireless terminal. Moreover, as used herein, "located at a premises" means that the wireless terminal is located within a premises, located at an entry or exit point of the premises or is located adjacent a premises.

The proximity detector 130 may operate using wireless signals, such as radio and/or optical signals, such as infrared signals. Proximity may be inferred by the presence of a signal from a wireless terminal, in which case the signals may be low power and/or line of sight. In other embodiments, proximity may be calculated by timing such that, for example, a round-trip time period between a transmit of a signal feature (such as a specific pulse or specific data) and receipt of a response from another end point, is measured, with the speed of the signal multiplied by the round-trip time to obtain the distance from which proximity may be determined via preconfigured distance thresholds, which may be specific to each proximity detector. In still other embodiments, the proximity detector may employ global positioning system (GPS) and/or other location signals that may be provided by a wireless terminal or determined from the wireless terminal. Other techniques of detecting proximity also may be used in various embodiments of the present invention. As was also described above, the proximity detector 130 also operates to identify the wireless terminal that is located at the premises 110. Moreover, identification may be performed by the proximity detector 130 in cooperation with other components of systems, methods and/or computer program products according to various embodiments of the invention. Identification may take place simultaneously with detecting proximity, by decoding a wireless terminal identity in the signal that is transmitted by the wireless terminal 120 that is located at the premises 110. Alternatively, identification may take place after initial detection of a wireless terminal 120 at the premises 110, by sending and/or receiving one or more additional signals. Examples will be provided below.

Still referring to FIG. 1, a monitor 140 and a rules database 150 also are provided. The monitor 140 obtains from the rules database 150, one or more operational authorization rules for a wireless terminal 120 that is identified and that apply to the premises 110 at which the wireless terminal 120 is located. The monitor 140 is configured to disable and/or enable selected operations of the wireless terminal that was identified in response to the operational authorization rule(s) that were obtained for the wireless terminal that was identified and that apply to the premises 110 at which the wireless terminal 120 is located. It will be understood that the functionality of the proximity detector 130, the monitor 140 and/or the rules database 150 may be integrated and/or distributed among various electronic components including computer hardware and/or computer software, which may be included at least partly in the wireless terminals 120 themselves.

In some embodiments of the present invention, the operational authorization rules 150 may be set by a party associated with the premises 110 and/or by a party associated with the wireless terminal 120, who may not be the user of the wireless terminal 120. In other embodiments, an operational authorization rule may include a plurality of scenarios for the wireless terminal 120 that was identified and that apply to the premises 110 at which the wireless terminal 120 is located. In these embodiments, first selected operations of the wireless terminal 120 may be disabled and/or enabled in response to occurrence of a first scenario at the premises 110 at which the wireless terminal 120 is located, and second selected operations may be disabled and/or enabled in response to occurrence of a second scenario at the premises 110 at which the wireless terminal 120 is located.

In some embodiments of the present invention, the disabling and/or enabling of selected operations of the wireless terminals 120 may include disabling and/or enabling selected operations of a wireless terminal 120 as a function of time of day, an event schedule at the premises, a class of the wireless terminal, a class of a message transmitted to or from the wireless terminal, the location of the wireless terminal within the premises and/or other functions. Many other examples will be provided below. Moreover, in some embodiments, respective transmit or receive operations for the wireless terminal may be disabled while enabling respective receive or transmit operations of the wireless terminal. Thus, for example, the wireless terminal may be placed in a receive only or transmit only mode. Moreover, in some embodiments, the selected operations of the wireless terminal can include applications that execute on the wireless terminal, functions that are provided by the wireless terminal and/or communications that are provided by the wireless terminal. Note that these functions are not necessarily limited to wireless-related functions such as various communications functions, but rather may also include computational and other functions, some of which may not be at all related to wireless functionality except that they may be in some fashion controllable directly or indirectly via communications occurring over a wireless link. Many examples will be provided below.

Some embodiments of the present invention may arise from recognition that it may be desirable for third parties, such as schools, businesses, organizations and facilities, to be able to effectively control the use of wireless terminals, including wireless computing devices and wireless communication devices, on their premises and/or during certain activities. For example, use of such devices in medical facilities can cause electronic interference with monitoring equipment, which can be life threatening to patients. Also, it may be desirable for schools to limit the use of communications devices during classes and to reduce or prevent criminal activities that may be related, for example, to drugs. However, this desire to control usage may conflict with the strong desire of the public to use wireless terminals, particularly since control may often be implemented by completely banning the devices. As an example, parents may strongly desire to provide cell phones to their children for emergency use and to check in with family members for the sake of safety. However, schools may desire, and in some cases may even be required, to limit cell phone use on their premises. Absent techniques for disabling and/or enabling selected operations of a cell phone, the only option that may be available for a school is to ban cell phones entirely.

Embodiments of the present invention can allow schools, businesses, organizations, and/or other third parties to dynamically and precisely control cell phone use on their premises, so that an effective limiting policy can be used which can be compatible with the various needs of parents, students and other members of the public, which may thereby reduce or eliminate the conflict described above. Accordingly, some embodiments of the present invention can provide systems, methods and/or computer program products to securely enable centralized control of on-premises wireless terminals by third parties that are associated with the premises, such as schools, businesses and other types of premises, in a precise manner that can employ convenient wireless signaling and allow a hierarchy of control authorization. Thus, for example, some embodiments of the present invention can allow parents to activate such third party control capabilities, and can allow a third party to monitor and verify that such control is in effect.

Figure 2:
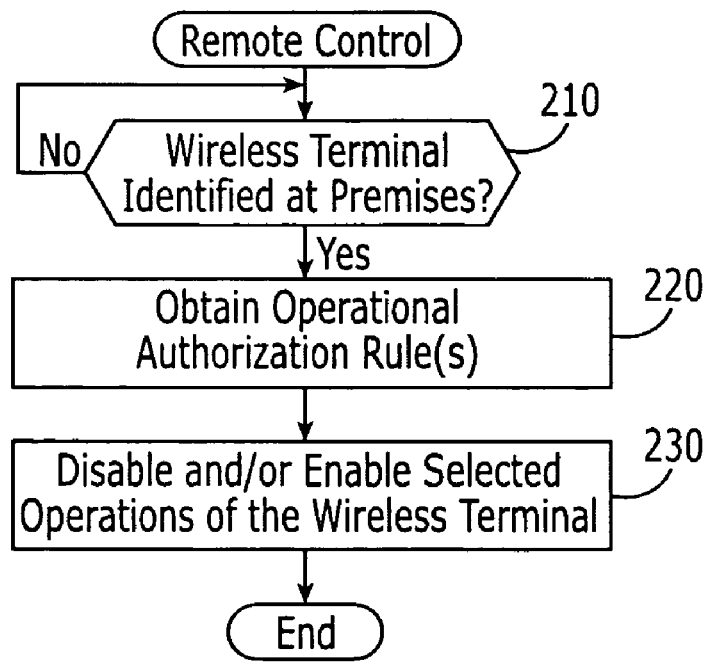
FIGS. 2-4 are flowcharts of operations that may be performed according to various embodiments of the present invention.

FIG. 2 is a flowchart of operations that may be performed to remotely control wireless terminals according to various embodiments of the present invention. These operations may be performed, for example, by one or more of the blocks of FIG. 1.

Referring to FIG. 2, at Block 210, a determination is made as to whether a wireless terminal has been identified at a third party premises. This may occur, for example, when an active wireless terminal enters the third party premises or when an inactive wireless terminal already located at the premises is activated/turned on. In some embodiments, a proximity detector, such as the proximity detector 130 of FIG. 1, may transmit a signal for a wireless terminal 120 to detect. In other embodiments, a wireless terminal 120 may transmit a signal for a proximity detector 130 to detect. In still other embodiments, proximity may be inferred from the presence of signals or calculated via timing differences between transmit and response. In some embodiments, the wireless terminal 120 may process a proximity signal that emanates from a proximity detector 130 that includes a third party transmitter. The wireless terminal 120 may identify the proximity signal from the third party, and determine exactly which third party it is. The wireless terminal 120 may also authenticate the third party, for example via cryptographic methods, such as public/private keys, digital signatures, etc.

Referring again to FIG. 2, at Block 220, one or more operational authorization rules are obtained, for example from a rules database 150. It will be understood by those having skill in the art that the rules database 150 may be contained at least partially within the wireless terminal itself, and/or in an external rules database 150 as was shown in FIG. 1.

Then, at Block 230, selected operations of the wireless terminal are disabled and/or enabled, for example by the monitor 140 of FIG. 1. Monitoring may be performed in the wireless terminals 120 themselves and/or in a monitor 140 that is external to the wireless terminals 120. Monitoring may determine if a specific third party is authorized to control the wireless terminal 120, and to what extent control is allowed. Monitoring may also grant control to the third party according to the authorizations, to the extent and in the specific manner(s) allowed. A notification also may be provided to the wireless terminal 120 that the third party control has been allowed. The third party also may be notified.

Figure 3:
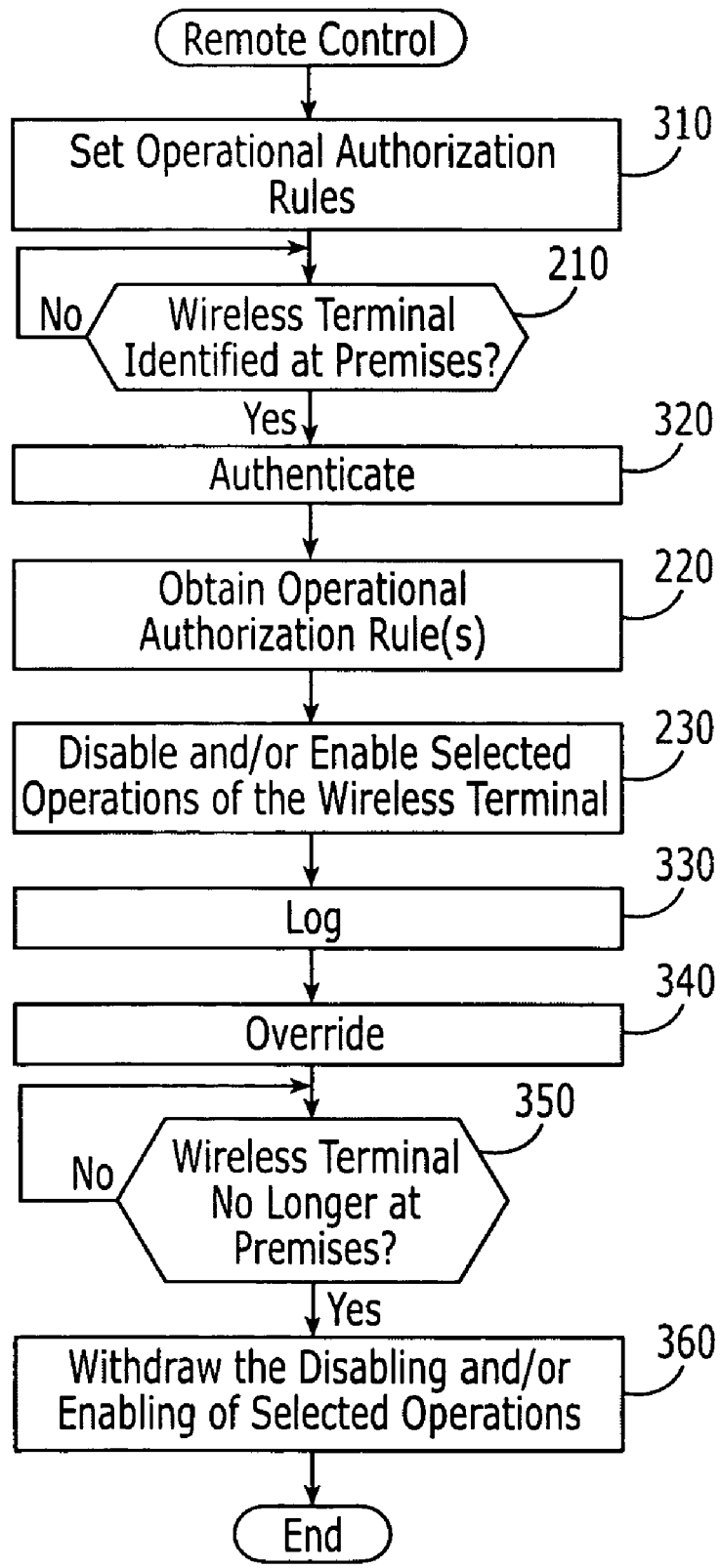

FIG. 3 is a flowchart of operations that may be performed to remotely control wireless terminals according to other embodiments of the present invention. These operations may be performed, for example, by one or more of the blocks of FIG. 1. Referring now to FIG. 3, operational authorization rules are set at Block 310. In some embodiments, an administrator, such as a parent, can authorize control by one or more specific third parties, such as a school. The authorization rules may be specified as a function of time of day, type of function, such as a software application, a hardware function, such as a camera phone, and/or a communication function, such as receive vs. transmit, a function of a called party, number or email address, emergency vs. non-emergency, voice vs. text messaging, still pictures vs. video and/or other function. Time constraints, such as time of day, may also be added to any function. After the operational authorization rules are set at Block 310, the identity determination of Block 210 is then made.

Still referring to FIG. 3, at Block 320, the third party associated with the premises may be authenticated by the wireless terminal 120. Authentication techniques may include private key/public key pairs that are generated for each end point wireless terminal 120 and/or proximity detector 130/monitor 140. In other embodiments, certificates may be used and may contain (trustable) public keys, and may be distributed. In still other embodiments, private keys may be used, which are kept private and protected, and not distributed. In yet other embodiments, one end point may encrypt a piece of data with its private key, and send this encrypted data plus an unencrypted version of that data to the other end point, which may then only decrypt the encrypted data version correctly using the first end point's public key, obtained from the first end point's certificate. Thus, successful decryption provides specific authentication of the first end point. These and/or other authentication techniques that are well known to those having skill in the art may be used to authenticate the wireless terminal 120 and/or the third party who is disabling and/or enabling selected operations of the wireless terminal 120.

Referring again to FIG. 3, operations of Blocks 220 and 230 are then performed. Then, at Block 330, the disabling and/or enabling of the selected operations of the wireless terminal 120 may be logged. More specifically, once a wireless terminal 120 has been identified and authenticated, the event may be logged and checks may be performed for errors, inconsistencies, problems and/or hacking. The third party also may be notified that its control (and any specific allowances or limitations) is accepted by the wireless terminal 120. The wireless terminal 120 also may be notified of the third party control.

Many techniques may be used to check for errors, inconsistencies, problems and/or hacking according to various embodiments of the present invention. For example, a determination may be made as to whether the notification contains errors, such as data not fitting expected values, patterns, options, etc. In some embodiments, the notifications may contain a wireless terminal ID, a third party ID, authentication data, event types, time/date, time to leave, etc. The notification may expire or time out after a configurable threshold period is exceeded. Other checking may be performed for illogical notifications (such as simultaneous control allowance and disengagement), inconsistent notifications (such as the same device being in two places or two third party premises at once) and/or suspicious notifications (such as too frequent notifications exceeding a rate threshold, notifications out of sequence, multiple same notifications exceeding a threshold and/or incomplete notifications). When an error, inconsistency, problem and/or hacking is found, an alert and/or alarm may be issued.

Referring again to FIG. 3, at Block 340, disabling and/or enabling may be overridden in response to an override condition. Override conditions may be provided with or without the need for administrator approval. For example, if the wireless terminal 120 attempts to do something control has disallowed, and potential override conditions are met, then a central monitor, such as monitor 140 of FIG. 1, may be informed. The central monitor may check that conditions are met and determine approval requirements. The central monitor may then allow an override or, if necessary, request approval for the override.

Referring now to Block 350, a determination is made as to whether the wireless terminal 120 is no longer at the premises 110. If so, then at Block 360, the disabling and/or enabling of selected operations may be withdrawn. More specifically, when the wireless terminal 120 leaves the premises 110, the wireless terminal 120 and/or the monitor 140 may deactivate the third party control corresponding to the specific premises. The wireless terminal 120 may notify the monitor 140 that the third party control previously allowed has been deactivated. The monitor 140 may identify and authenticate the wireless terminal 120, log the event, check for errors, inconsistencies, problems and/or hacking, and notify the third party of controlled deactivation.

It will be understood that, in other embodiments of the invention, one or more of Blocks 310, 320, 330, 340, 350 and 360 may be performed, rather than all of Blocks 310-360 as shown in FIG. 3. In other embodiments of the invention, one, more than one or all of Blocks 310, 320, 330, 340, 350 and 360 may be performed with any of the other embodiments described herein.

Figure 4:
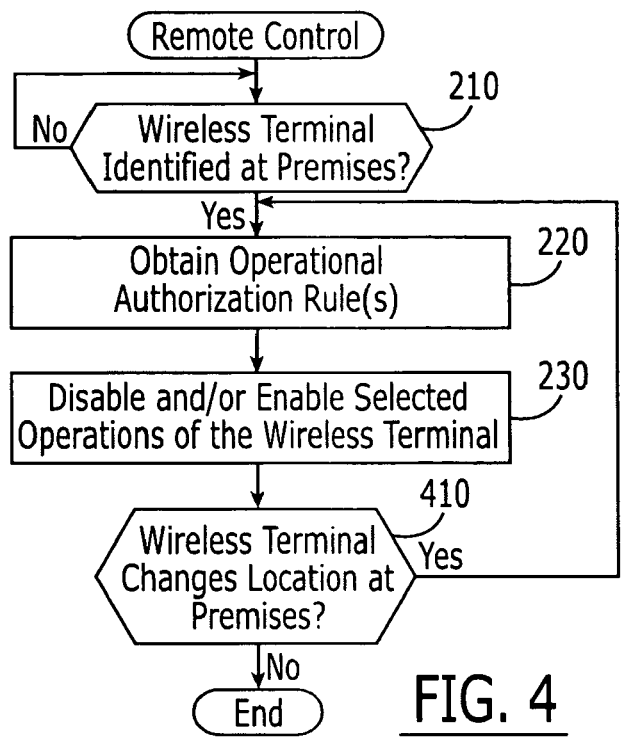

FIG. 4 is a flowchart of operations that may be performed according to yet other embodiments of the present invention. In embodiments of FIG. 4, various rules may be applied at various locations within a given premises 110. For example, in a school, different rules may apply to wireless terminals 120 that are located in a classroom, in a study hall, in a school cafeteria or on the school grounds. Accordingly, the operational authorization rules may include a plurality of scenarios for the wireless terminal 120 that apply to the premises 110 at which the wireless terminal 120 is located. In other embodiments, the rules may include a plurality of scenarios for the wireless terminal 120 that apply as time passes, while the wireless terminal 120 is located at a premises 110.

As shown in FIG. 4, after operations of Blocks 210, 220 and 230 are performed, a determination is made at Block 410 as to whether the wireless terminal 120 has changed its location at the premises 110. If yes, a new set of rules may be obtained at Block 220 or the new set of rules may already have been obtained as part of the rules for the premises 110. Then, at Block 230, selected operations of the wireless terminal 120 are disabled and/or enabled in response to the new scenario. Accordingly, disabling and/or enabling may be performed at Block 230 by disabling and/or enabling first selected operations of the wireless terminal in response to occurrence of a first scenario at the premises at which the wireless terminal is located, and disabling and/or enabling second selected operations of the wireless terminal in response to occurrence of a second scenario at the premises at which the wireless terminal is located. The scenario can be location-based, time-based and/or based on other factors. It will be understood by those having skill in the art that operations of FIG. 4 may be combined with operations of FIGS. 2 and/or 3.

Figure 5:
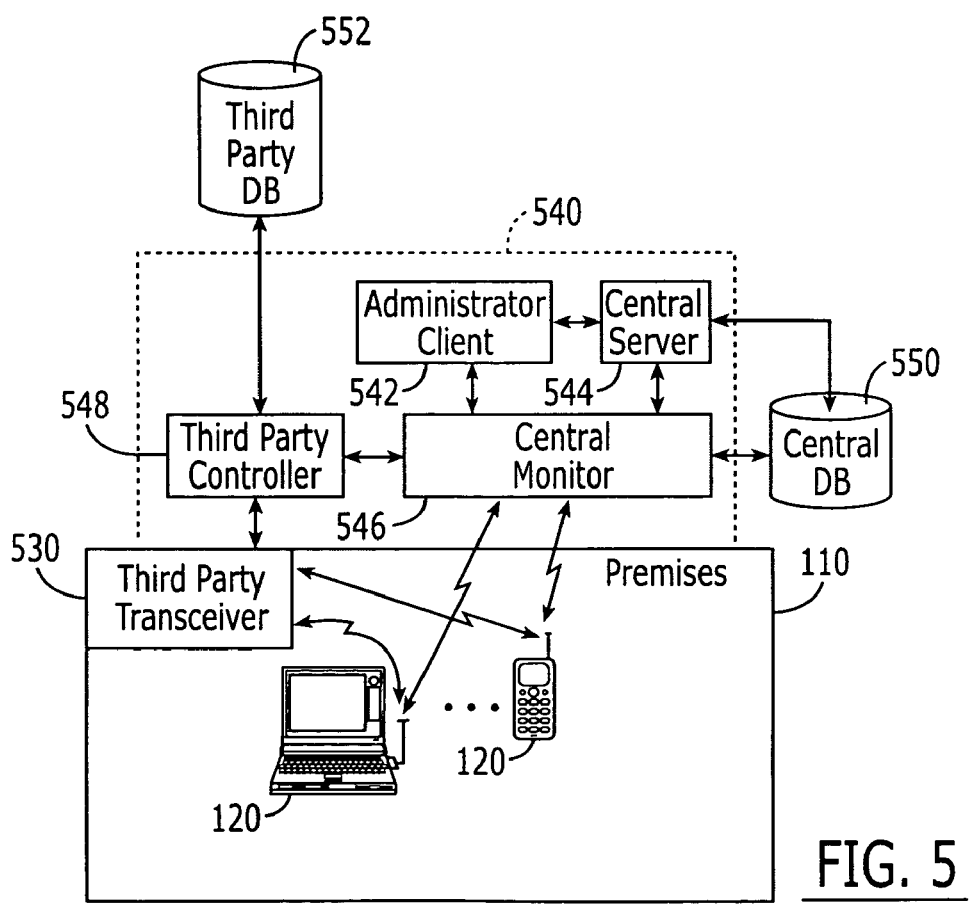
FIG. 5 is a block diagram of systems, methods and/or computer program products according to other embodiments of the present invention.

FIG. 5 is a block diagram of other embodiments of the present invention. In FIG. 5, some or all of the functionality of the proximity detector 130 of FIG. 1 may be embodied in a third party transceiver 530. Moreover, in FIG. 5, some or all of the functionality of the monitor 140 of FIG. 1 may be embodied in the monitor 540 by an administrator client 542, a central server 544, a central monitor 546 and a third party controller 548. The rules database 150 of FIG. 1 may be embodied by a central database 550, also referred to as a central preferences database 550, and by a third party database 552, also referred to as a third party usage policy database 552. It also will be understood, however, that many of the functions of Blocks 530-552 may be combined or further separated according to other embodiments of the present invention. The entity that is associated with the premises, such as the school, business, government institution, homeowner, entertainment venue owner, etc. will be referred to as a "third party". Moreover, the entity that is associated with the wireless terminal, but which is generally not the person carrying the wireless terminal, such as the parent of a school child who carries the wireless terminal, will be referred to as an "administrator". Finally, the rules that are set by the administrator may be referred to herein as "preferences", whereas the rules set by the third party may be referred to herein as "usage policies".

Referring again to FIG. 5, the third party transceiver (transmitter/receiver) 530 communicates with the wireless terminals 120, to identify wireless terminals 120 that are located at the premises 110. The third party controller 548 may actually determine the wireless terminal proximity and/or the wireless terminal leaving the premises 110, using information provided by the third party transceiver 530, and may access the usage policy for the premises from the third party database 552 and send the usage policy securely to wireless terminal 120 via the third party transceiver 530. The third party database 552 can store public keys, certificates and/or usage policy information and can log wireless terminal proximity, wireless terminal control that is allowed, and wireless terminals 120 that are entering or leaving the premises 110. Thus, the third party controller 548 may be configured to provide the rules that apply to the premises 110 from the third party usage policy database 552 to at least one wireless terminal 120 that is located at the premises 110.

The administrator client 542 can securely set preferences, including a listing of authorized third parties ("authorizations"), via a Web page provided by the central server 544. The administrator client 542 can also respond securely to override approval requests that are received from the central monitor 546.

The central server 544 may be a central Web server that allows communications with the administrator client 542 and the central database 550. The central database 550 can store the administrator's preferences, wireless terminal and third party identifications, public keys, certificates, events including notifications, override requests and grants, alerts and/or alarms. In some embodiments, the central monitor 546 receives the administrator's preferences from the central server 544, summarizes them as appropriate for the wireless terminal 120, and sends the preferences to the wireless terminal 120. The central monitor 546 also processes notifications from the wireless terminal 120 and securely informs the third party controller 548 accordingly, and may, as appropriate, trigger alerts and/or alarms. The central monitor 546 also may, when desirable, securely request override approval from the administrator 542, and may securely grant override approval to the wireless terminal 120.

In some embodiments, the wireless terminals 120 participate securely in proximity detection, and securely receive summarized preferences from the central monitor 546. The wireless terminals 120 also receive a requested usage policy securely from the third party database 552 via the third party controller 548. The wireless terminals 120 also determine a portion of the usage policy that is allowed by the administrator client 542, and set their operation accordingly. Finally, the wireless terminals 120 may securely request overrides via the central monitor 546 when appropriate. However, in other embodiments, one or more of these operations also may be performed, at least in part, in the monitor 540.

Thus, in some embodiments of the present invention, a central monitor 546 is configured to provide the rules that apply to the wireless terminal 120, from the central preferences database 550 to at least one wireless terminal 120 that is located at the premises 110. The central server 544 is configured to accept administrator preferences for a plurality of wireless terminals 120, for example from an administrator client 542, and to store the administrator preferences in the central preferences database 550.

Examples of operations of various embodiments of the present invention will now be provided, where the premises 110 is a school, a business or an entertainment venue (theatre, auditorium, museum, stadium, etc.). The following examples shall be regarded as merely illustrative and shall not be construed as limiting the invention.

When the premises 110 is an educational institution (school), the enabling and/or disabling of selected operations of a wireless terminal 120 may be tied via time/date to a class schedule (e.g., calls allowed in study hall but not in other class periods). They may be tied to a test schedule (e.g., calls and/or other communications not allowed during teacher-entered test periods, during SAT's, etc.). They may be tied to particular computing actions/features/applications as well as communications. Emergency and other specific calls (e.g. to school security departments, etc.) may be specifically allowed. The emergency call may be a "911" call or a call to a parent, principal, etc. Calls also may be allowed in certain school locations (e.g., the lunch room) but not in others (e.g., classroom buildings), via designating multiple sub-ID's for distinct locations within a single third party school ID location, with each sub-ID location being set up with its own transceiver(s) so multiple distinct proximity determinations are enabled within the overall school premises.

Moreover, in some embodiments, the disabling and/or enabling of selected operations may change without movement of the wireless terminal. For example, while in the school cafeteria, different rules may apply during lunch period, as opposed to class periods. As another example, if an emergency happens at the school, all of the rules may be updated, regardless of the locations of the wireless terminals.

When the premises 110 is a business, disabling and/or enabling of selected operations of a wireless terminal 120 may be tied to type of personnel (e.g., employee, contractor, vendor, visitor, etc.) carrying the wireless terminal. Various operations may be allowed in certain business locations (e.g., office areas, the cafeteria, and/or other informal gathering areas) but not in others (e.g., conference rooms), via designating multiple sub-ID's for distinct locations within a single third party business ID location, with each sub-ID location set up with its own transceiver(s) so multiple distinct proximity determinations are enabled. Emergency and other specific calls (e.g. to business security departments, etc.) may be specifically allowed. They also may be tied to particular computing actions/features/applications as well as communications. As noted above, the selected operations may change based on new rules, without requiring movement of the wireless terminals. Also, note that a school may be considered in some respects to be similar to a business, and thus different treatment at a school may be given to teachers versus students for example, similar to different treatments being given to employees of a business versus contractors or visitors to the business.

Finally, when the premises 110 is an entertainment venue, such as a theatre, auditorium, museum or stadium, disabling and/or enabling selected operations of a wireless terminal 120 may be tied to type of personnel (e.g., employee, contractor, vendor, patron/customer, etc.) carrying the wireless terminal. They may be tied to facility schedule (e.g., calls allowed prior to a movie or concert, after the movie or concert, and during intermission) but not during the actual movie, concert, play, sporting event, etc. Emergency and other specific calls (e.g. to facility security departments, etc.) may be specifically allowed. Rules also may be tied to particular computing actions/features/applications as well as communications.

The following example illustrates how embodiments of the present invention may be used with a wireless terminal carried by a student during the course of a day. This example shall be regarded as merely illustrative and shall not be construed as limiting the invention. In this example, June and Ward have subscribed to a provider's "school cell phone and computing device safety" service which is advertised to work with their son Wally's school premises 110 and also to be compatible with Wally's particular PDA/phone 120. June notes that the required software is already part of Wally's brand of PDA/phone. After discussing a while with June, Ward has set their preferences on the service's central server Web site 544, at which point the service's central monitor 546 has enabled the associated features on Wally's PDA/cell phone 120 as well as in the local system (third party) controller 548 at his school, for example by generating/distributing certificates and keys, as well as downloading his parents' preferences into Wally's PDA/phone.

Subsequently, Wally goes to school, and as he enters the school one of the local (third party) transceivers 530 exchanges signals with Wally's PDA/cell phone 120, such that proximity is detected by both, and Wally's PDA/cell phone is identified. The transceiver 530 informs the local school (third party) controller 548 that Wally's PDA/phone is present, which checks its database 552 and then requests control limitation of Wally's PDA/phone according to the school's policy.

Wally's PDA/phone 120 receives the control request and compares it to the summarized preferences and authorizations provided to the PDA/phone by the service's central monitor 546. His PDA/phone determines that the control request is authenticated (via cryptographic certificate) as one of his parents' authorized third parties, and is acceptable with one exception: that Wally's parents want 911 calls to always be allowed, no matter what class Wally is in. So, his PDA/phone grants the third party control with that one exception, and so informs the service's central monitor 546, which so notifies the school (third party controller 548). Wally's PDA/phone pops up a message informing Wally that third party control is in effect, with the name and ID of the third party (Wally's school) indicated. An icon or command is temporarily added to Wally's PDA/phone which enables Wally to look at and examine the specific details of the third party usage policy defining the controls currently in effect, and also the exception made (911 calls) due to his parent's authorization preferences. Due to a setting of his parents' preferences, however, Wally is not allowed to see all of his parents' preference settings directly, only the exception triggered by the applying the school's usage policy to those preferences.

During a test in Wally's economics class, he notices that his PDA/phone's financial calculator program is disabled during the test, leaving only the standard calculator enabled, in accordance with his teacher's desire to test students on performing those type of financial calculations themselves. In study hall, his PDA/phone allows him to call his friend Eddie, but in math class he can't, in accordance with school policy that allows extraneous activity during informal schedule periods but not in formal subject class periods. When he tries to call Eddie in math class, a pop-up on his PDA/phone informs him that the action is blocked by third party usage policy currently in effect, indicating the name and ID of the third party.

In his next class, after consulting with his teacher, he tries to call his mother June to let her know whether she needs to meet with his teacher after school, but his PDA/phone blocks the call. However, calls to either one of his parents match override conditions his father Ward had set in the parent's preferences, such that Wally's PDA/phone requests an override from the service's central monitor 546. The central monitor 546 receives the override, determines that this needs administrator approval, and so requests approval from Ward according to the parents' preferences. When Ward doesn't answer, the central monitor 546 requests approval from June, who receives the request and approves it, upon which the central monitor 546 grants the override to Wally's PDA/phone. A pop-up on Wally's PDA/phone indicates the override is granted, so he can call his mother, and so he does.

Later, when he looks out a window in math class and sees someone stealing a car in the parking lot, his PDA/phone allows him to call 911 as well as the school's security guard hotline. When he leaves school later, Wally's PDA/phone detects that proximity is no longer in effect (the school transceiver 530 also detects this), and thus his PDA/phone disengages the third party school usage control, and communicates this to the service's central monitor 546, which so notifies the school, via the third party controller 548. His PDA/phone also pops up a message that third party control is now disengaged. Wally then calls his little brother Theodore to see if he wants to go play baseball after school.

It will be understood that many of the embodiments and examples that were described above in connection with FIG. 5 allow the wireless terminal 120 itself to determine whether an action (use of a function, execution of an application and/or a communication) is authorized by receiving third party usage policies from the third party database 552 via the third party controller 548 and the third party transceiver 530, and receiving administrator preferences from the central database 550 via the central server 544 and the central monitor 546. However, in other embodiments, the third party controller 548, the central monitor 546 and/or other functionality provided in monitor 540 may determine whether the action is authorized and may send an activate or deactivate signal to the wireless terminal 120 in response thereto. In still other embodiments, both the wireless terminal 120 and the monitor 540 may play a role in providing this functionality.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of remotely controlling wireless terminals comprising:
   identifying a wireless terminal that is located at a premises located equipment;
   setting at least one operational authorization rule for the wireless terminal that was identified and that applies to the premises at which the wireless terminal is located, by a party associated with the premises and/or by a party associated with the wireless terminal;
   authenticating the party associated with the premises by the wireless terminal is performed;
   obtaining the at least one operational authorization rule for the wireless terminal that was identified and that applies to the premises at which the wireless terminal is located;
   determining a time of day, an event schedule at the premises, a class of the wireless terminal and a class of the user of the wireless terminal; and
   disabling and/or enabling selected operations of the wireless terminal as a function of the determining step and that was identified in response to the at least one operational authorization rule that was obtained for the wireless terminal that was identified and that applies to the premises at which the wireless terminal is located.

2. A method according to claim 1 wherein setting comprises:
   obtaining a first operational authorization rule for the wireless terminal that is set by a party associated with the premises;
   obtaining a second operational authorization rule for the wireless terminal that is set by a party associated with the wireless terminal; and
   combining the first and second operational authorization rules.

3. A method according to claim 1 wherein disabling and/or enabling is followed by:
   logging the disabling and/or enabling of the selected operations of the wireless terminal.

4. A method according to claim 1 wherein disabling and/or enabling is followed by:
   identifying that the wireless terminal is no longer located at the premises; and
   withdrawing the disabling and/or enabling of the selected operations of the wireless terminal in response thereto.

5. A method according to claim 1:
   wherein the at least one operational authorization rule includes a plurality of scenarios for the wireless terminal that was identified and that apply to the premises at which the wireless terminal is located; and
   wherein disabling and/or enabling comprises disabling and/or enabling first selected operations of the wireless terminal in response to occurrence of a first scenario at the premises at which the wireless terminal is located, and disabling and/or enabling second selected operations of the wireless terminal in response to occurrence of a second scenario at the premises at which the wireless terminal is located.

6. A method according to claim 1 wherein disabling and/or enabling is followed by:
   overriding the disabling and/or enabling of the selected operations in response to an override condition.

7. A method according to claim 1 wherein the premises comprises an educational institution, a business facility, a government facility, an apartment/housing complex, a neighborhood, a city block, a residence and/or an entertainment venue.

8. A method according to claim 1 wherein the selected operations of the wireless terminal comprise:
   applications that execute on the wireless terminal;
   functions that are provided by the wireless terminal; and/or
   communications that are provided by the wireless terminal.

9. A system of remotely controlling wireless terminals comprising:
   a rules database that is configured to store therein operation authorization rules for wireless terminal as a function of premises at which the wireless terminals may be located;
   a proximity detector located at a premises that is configured to identify at least one wireless terminal that is located at the premises; and a monitoring system that is response to the proximity detector and to the rules database and that is configured to disable and/or enable selected operations of the at least one wireless terminal that is located at the premises in response to at least one operational authorization rule for the at least one wireless terminal that applies to the premises at which the wireless terminal is located by a party associated with the premises and/or a party associated with the wireless terminal, the monitoring system further configured to:

authenticate the party associated with the premises by the wireless terminal before any operations of the wireless terminal are disabled and/or enabled;

determine a time of day, an event schedule at the premises, a class of the at least one wireless terminal, and a class of the user of the wireless terminal; and disable and/or enable the selected operations of the at least one wireless terminal based on the determining of the monitoring system.

10. A system according to claim 9 wherein the rules database comprises:

a third party usage policy database that is configured to store therein rules that apply to the premises that is controlled by a third party; and a central preferences database that is configured to store therein rules that apply to the wireless terminals.

11. A system according to claim 10 wherein the monitoring system comprises:

a third party controller that is configured to provide the rules that apply to the premises, from the third party usage policy database to the at least one wireless terminal that is located at the premises; and a central monitor that is configured to provide the rules that apply to the at least one wireless terminal, from the central preferences database to the at least one wireless terminal that is located at the premises.

12. A system according to claim 11 wherein the at least one wireless terminal is configured to disable and/or enable selected operations thereof in response to the rules that apply to the premises and the rules that apply to the wireless terminal.

13. A system according to claim 10 wherein the monitoring system is configured to disable and/or enable selected operations of the at least one wireless terminal that is located at the premises, in response to the rules that apply to the premises and the rules that apply to the wireless terminal.

14. A system according to claim 11 further comprising:

a central server that is configured to accept administrator preferences for a plurality of wireless terminals and to store the administrator preferences in the central preferences database.

15. A system according to claim 9 wherein the selected operations of the at least one wireless terminal comprise:

applications that execute on the at least one wireless terminal;

functions that are provided by the at least one wireless terminal; and/or communications that are provided by the at least one wireless terminal.

16. A computer readable medium encoded with a computer program that is configured to remotely control wireless terminals, the computer program product comprising a computer usable storage medium having computer-readable program code embodied in the medium, the computer-readable program code comprising:

computer-readable program code that is configured to provide a rules database that is configured to store therein authorization rules for wireless terminals as a function of a plurality of premises at which the wireless terminals may be located;

computer-readable program code that is configured to set at least one operational authorization rule for the wireless terminal from the rules database and applies to a corresponding one of the plurality premises and/or party associated with the wireless terminal;

computer-readable code operating in premises located equipment that is configured to identify wireless terminals located at the premises;

computer-readable program code that is configured to authenticate the premises by the wireless terminal before any operations of the wireless terminal are disabled and/or enabled;

computer-readable program code that is configured to authorize the disabling and/or enabling of selected operations of at least one wireless terminal that is located at a premises;

computer-readable program code that is configured to determine a time of day, an event schedule at the premises, a class of the wireless terminal and a class of the user of the wireless terminal; and computer-readable program code that is configured to disable and/or enable selected operations of at least one wireless terminal that is located at a premises based on the determining step.

* * * * *

UNITED STATES PATENT AND TRADEMARK OFFICE
CERTIFICATE OF CORRECTION

| | | |
|---|---|---|
| PATENT NO. | : 7,400,891 B2 | Page 1 of 1 |
| APPLICATION NO. | : 10/985266 | |
| DATED | : July 15, 2008 | |
| INVENTOR(S) | : Aaron | |

It is certified that error appears in the above-identified patent and that said Letters Patent is hereby corrected as shown below:

In the Claims:

Column 14, Claim 9, Line 62:  Please correct "operation"
To read -- operational --

Signed and Sealed this

Twenty-first Day of October, 2008

JON W. DUDAS
*Director of the United States Patent and Trademark Office*